United States Patent
Janoska

(10) Patent No.: US 6,996,107 B2
(45) Date of Patent: Feb. 7, 2006

(54) PACKET SHAPING ON A FIXED SEGMENT SCHEDULER

(75) Inventor: Mark William Janoska, Carleton Place (CA)

(73) Assignee: PMC-Sierra Ltd., Burnaby (CA)

( * ) Notice: Subject to any disclaimer, the term of this patent is extended or adjusted under 35 U.S.C. 154(b) by 988 days.

(21) Appl. No.: 09/969,809

(22) Filed: Oct. 4, 2001

(65) Prior Publication Data

US 2003/0072313 A1    Apr. 17, 2003

Related U.S. Application Data

(60) Provisional application No. 60/238,037, filed on Oct. 6, 2000.

(51) Int. Cl.
  *H04L 12/56*    (2006.01)
(52) U.S. Cl. ................. 370/395.4; 370/412; 370/230.1
(58) Field of Classification Search ........ 370/229–238, 370/412–419, 395.4
See application file for complete search history.

(56) References Cited

U.S. PATENT DOCUMENTS

| | | | |
|---|---|---|---|
| 5,818,839 A * | 10/1998 | Sterne et al. ............... | 370/391 |
| 5,867,230 A | 2/1999 | Wang et al. | |
| 5,875,175 A | 2/1999 | Sherer et al. | |
| 5,905,730 A | 5/1999 | Yang et al. | |
| 5,926,459 A | 7/1999 | Lyles et al. | |
| 6,064,050 A | 5/2000 | Kappler et al. | |
| 6,064,677 A | 5/2000 | Kappler et al. | |
| 6,072,772 A | 6/2000 | Charny et al. | |
| 6,094,426 A | 7/2000 | Honkasalo et al. | |
| 6,170,042 B1 | 1/2001 | Gaertner et al. | |
| 6,396,843 B1 * | 5/2002 | Chiussi et al. ............... | 370/418 |
| 6,477,144 B1 * | 11/2002 | Morris et al. ............ | 370/230.1 |
| 6,529,474 B1 * | 3/2003 | Bonneau et al. ............ | 370/230 |
| 6,721,325 B1 * | 4/2004 | Duckering et al. ...... | 370/395.4 |

OTHER PUBLICATIONS

"Calendar Queues: A Fast O(1) Priority Queue Implementations for the Simulation Event Set Problem"-Randy Brown, Communications of the ACM-Oct. 1988, vol. 31, No. 10, pp. 1220-1227.

* cited by examiner

*Primary Examiner*—Frank Duong
*Assistant Examiner*—Michael J. Moore
(74) *Attorney, Agent, or Firm*—Curtis B. Behmann; Dennis Haszko; Borden Ladner Gervais LLP

(57) ABSTRACT

Methods and devices for scheduling data transmission processing based on the size of the data transmission unit and a predetermined increment value. A scheduler has slots which represent specific amounts of time in which a queue of data transmission units to be processed is represented. An indicator determines which slot and thereby which queue is being examined. Each queue is assigned a specific increment value and each data transmission unit in a queue is assigned a count value based on the size of the data transmission unit. When a data transmission unit is at the head of the queue and is a candidate for processing, if the count value is greater than a predetermined value then the queue and thereby the data transmission unit at the head of the queue is rescheduled at a later time. This is effected by assigning the queue to a subsequent slot in the scheduler. The subsequent slot in the scheduler is determined based on the given increment value for that queue. The increment value is based on how many data transmission units are desired to be processed within a given amount of time.

6 Claims, 2 Drawing Sheets

PACKET SHAPING ON A FIXED SEGMENT SCHEDULER

This application relates to U.S. Provisional Patent Application 60/238,037 filed Oct. 6, 2000.

FIELD OF INVENTION

The present invention relates to networking technology for scheduling the processing of data transmission units.

BACKGROUND TO THE INVENTION

The recent increase interest in and dependence on computer networks has highlighted a myriad of problems in networking technologies. One of these possible problems relates to the buffering and later processing of data transmission units (DTU) in nodes of a computer network. As data transmission units are buffered in a node in a computer network, these buffered data transmission units need to be processed for re-transmission to their destinations. One issue surrounding this technology is the scheduling of these data transmission units for dispatch. Specifically, the question revolves around the concept of achieving a sustainable and relatively constant rate of data transmission units processed per second.

In networking, it is desirable that a constant flow of data transmission units exit a buffering node so that data transmission units need not be delayed in transit. Pursuant to this designers have tried to mimic a constant flow of water as the desirable model for the outflow of data transmission units from a network node. Unfortunately, there have been quite a few problems with such a model. One of these major problems arises when different sized data transmission units are processed. A constant outflow of data transmission units is easier to attain if the data transmission units have a fixed, predetermined size. However, if different sized data transmission units are used, there is no predictability as to how long processing a data transmission unit will take. For fixed size data transmission units, the fixed nature of their size allows for a predictable processing time. Clearly, such an advantage is absent for differently sized data transmission units.

Another issue relates to the limited size of the data structure used to schedule these data transmission units. Since memory is not unlimited, the data structure to be used must be bounded in size but must also be able to meet the needs of the system. Specifically, the data structure must be able to schedule events in the future but must also be able to hold multiple groups of data transmission units for processing.

Yet a third issue that must be addressed is the possibility of having different desired processing rates for different data transmission units. As an example, data from a first node may have a lower priority than data from a second node. As such, data from the second node should be dispatched or processed at a faster rate than data from the first node. A desired processing rate for data transmission units from the second node must therefore be higher than a desired data transmission rate for the first node. The scheduling scheme and the data structure to be employed must be able to account for the above issue of differing priorities for different data streams.

Based on the above, there is therefore a need for a novel scheduling scheme that can handle both fixed size data transmission units and differently sized data transmission units within a flow of transmitted data while keeping the data structures to a reasonable minimum. It must be noted that in this context the term size is to be understood to mean the amount of data, usually measured in bytes, that a data transmission unit contains. It should also be understood that the term data transmission unit encompasses all types of units which are used to encapsulate data for transmission. This may therefore encompass segments, packets, or any other data encapsulation units regardless of the protocol or standard used.

SUMMARY OF THE INVENTION

The present invention seeks to provide methods and devices for scheduling data transmission processing based on the size of the data transmission unit and a predetermined increment value. A scheduler has slots which represent specific amounts of time in which a queue of data transmission units to be processed is represented. An indicator determines which slot and thereby which queue is being examined. Each queue is assigned a specific increment value and each data transmission unit in a queue is assigned a count value based on the size of the data transmission unit. When a data transmission unit is at the head of the queue and is a candidate for processing, if the count value is greater than a predetermined value then the queue and thereby the data transmission unit at the head of the queue is rescheduled at a later time. This is effected by assigning the queue to a subsequent slot in the scheduler. The subsequent slot in the scheduler is determined based on the given increment value for that queue. The increment value is based on how many data transmission units are desired to be processed within a given amount of time.

In a first aspect the present invention provides a method of scheduling data transmission units for processing, the method comprising:

a) providing a scheduler having a plurality of slots, each slot representing a specific amount of time, the scheduler further having an indicator which indicates which slot is being examined, the indicator sequentially moving from one slot to another when the specific amount of time has elapsed;

b) providing at least one queue of data transmission units for processing, the or each queue being assigned an increment value based on a desired processing rate in portions of data transmission units per second for the or each queue, with all portions having a single predetermined fixed size, each data transmission unit being assigned a count value based on the size of the data transmission unit;

c) assigning each queue a specific slot in the scheduler; and d) when the indicator encounters a queue in a slot in the scheduler, executing the following steps:

d1) determining the increment value for the queue;

d2) determining the count value assigned to a data transmission unit at a head of the queue; and either d3) if the count value of the data transmission unit is greater than a predetermined value, decrementing the count value, and reassigning the queue to another subsequent slot in the scheduler based on the count value of the data transmission unit and on the increment value for the queue; or d4) if the count value of the data transmission unit is equal to the predetermined value, processing the data transmission unit and removing it from the queue.

In a second aspect the present invention provides a method of scheduling processing of data transmission elements using a scheduler having slots, each slot having a location and each slot representing a fixed amount of processing time, the method comprising:

a) choosing a slot in the scheduler;
b) determining if the slot has a data transmission unit assigned;
c) if the slot has a data transmission unit assigned, executing the following steps:
  c1) retrieving a count value for the data transmission unit;
  c2) if the count value is greater than a predetermined value, reassigning the data transmission unit to a subsequent slot in the scheduler and decrementing the count value, the location of the subsequent slot being determined by an increment value associated with a specific service level for the data transmission unit; and
  c3) if the count value is equal to or less than the predetermined value, processing the data transmission unit;
d) choosing a next slot in the scheduler and repeating steps b)–d).

BRIEF DESCRIPTION OF THE DRAWINGS

A better understanding of the invention will be obtained by a consideration of the detailed description below, in conjunction with the following drawings, in which.

DETAILED DESCRIPTION

Figure 1:
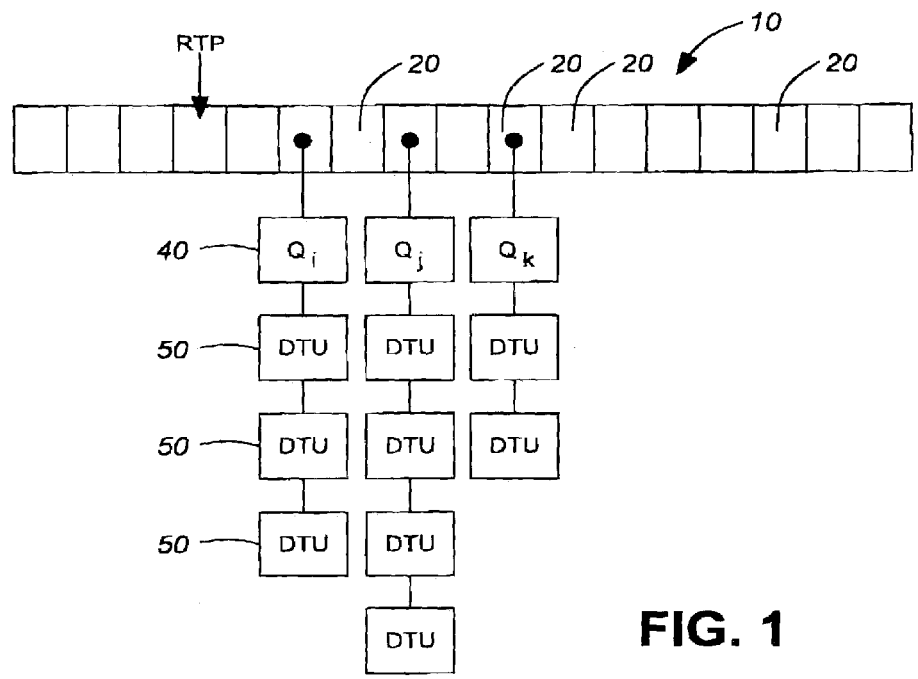
FIG. 1 is a schematic representation of a scheduler.

Referring to FIG. 1, a representation of a scheduler 10 or a calendar is illustrated. The scheduler 10 has a plurality of slots 20 each of which represents a specific fixed amount of time. A real time pointer 30 (RTP) points to the slot that is currently being processed. The RTP 30 moves from one slot to another at the end of every fixed period of time. Thus, if each slot represents 0.5 seconds then every 0.5 seconds the RTP moves to the next slot in the sequence.

As illustrated in FIG. 1, each slot may have associated with it, or assigned to it, a queue 40 of data transmission units 50 that are waiting for processing. It should be noted that while FIG. 1 illustrates the DTU's 50 as being in the queue, a person skilled in the art may use pointers in the queue to represent the actual data transmission units 50 that are in the queue. Thus, each queue can be a sequential list of pointers pointing to the data transmission units that are to be sequentially processed. It should also be noted that the head of the queue is the data transmission unit or the pointer to the data transmission unit that is about to be processed or that is the immediate candidate for processing.

As noted above, designers wish to model the processing of data transmission units on a constant fluid flow. This can be achieved if the data transmission units have a predetermined fixed size and if the amount of time represented by each slot in the scheduler corresponds to the amount of time required to process a single data transmission unit with the fixed predetermined size. If these two conditions are met then the flow of data transmission units dispatched by the scheduler would be constant, as for each slot in the scheduler, one data transmission unit would be dispatched for processing. This rate may be increased by reducing the fixed predetermined size of each data transmission unit while keeping the amount of time represented by each slot as constant. Conversely, the rate may also be increased by increasing the amount of time represented by each slot while keeping constant the fixed predetermined size of each data transmission unit.

To use the same concepts as outlined above and to apply them to different sized data transmission units, it is advantageous if the different sizes of the data transmission units can be represented in terms of portions which have a fixed predetermined size. Thus, if the fixed predetermined size is, for example, 30 bytes, then a data transmission unit having 90 bytes would have three portions. Similarly, a data transmission unit having 110 bytes would have 4 portions, with the last portion being a partially filled space of 30 bytes.

To prevent large data transmission units from clogging the scheduler, smaller sized data transmission units may be dispatched first. Thus, if queues A, B, and C have data transmission units for processing with sizes of 10, 30, and 150 bytes, respectively, then processing the 150 byte data transmission unit first would clog up the system. This larger data transmission unit would use five slots in the scheduler to process while the other two would each only use one slot. If this was the case, then the data flow out of the scheduler would be delayed and other smaller data transmission units waiting for processing would be backlogged. It would therefore be advantageous if the smaller data transmission units were processed first and the larger data transmission units rescheduled for later processing. However, this approach also has its pitfalls. If there were no bounds as to how far the larger data transmission units could be rescheduled, large data transmission units would never get processed as smaller data transmission units would always be processed ahead of the larger data transmission units.

The concepts outlined above can be combined to arrive at a scheduler that can handle both data transmission units of a fixed predetermined size and different sized data transmission units. Furthermore, larger data transmission units can be rescheduled for later processing but with a bounded waiting time.

By implementing a count value to be assigned to each data transmission unit in a queue, and by using this count value as providing the triggering event when the data transmission unit is to be processed, the above concepts can be implemented. In terms of rescheduling a larger data transmission unit, by using a fixed increment value, representing how many slots a data transmission unit is to be delayed by, the delay time for a data transmission unit is therefore bounded. To further explain the increment value, it must be noted that each increment value is specific to a specific queue. It should also be noted that the increment value for a queue is dependent on the desired processing rate for that queue. If a fixed amount of data is to be dispatched from a specific queue for every given amount of time then this value can be used to calculate the increment value. As an example, if the fixed predetermined size for a portion of data is set to be 30 bytes, this value may be used in determining the increment size. From this example, if a designer wished to have two portions processed per second from a specific queue then any data transmission units that are 30 bytes in size or less may be processed at a rate of two STM's per second. To extend the above concept, the increment value for a queue is determined by the formula $$INC = \frac{1}{D \times r}$$

where

INC is the increment value;

D is the specific amount of time; and r is the desired processing rate in portions of data transmission units per second.

As can be seen, the increment value is dependent on the desired processing rate for the queue. This desired processing rate may be related to a service level to which a queue is entitled. Thus, a queue with high priority data would have a higher service level than a queue with lower priority data. This means that a higher service level will have a higher desired processing rate and a smaller increment value.

The count value assigned to each data transmission unit, as explained above, is dependent on the size of that data transmission unit relative to that fixed predetermined size of each portion minus 1. As an example, if the predetermined size of each portion is 30 bytes and a data transmission unit had 30 bytes then the count value assigned to that data transmission unit is zero as the number of portions fitting within that data transmission unit is one and the count value is this number less one. As a further example, if a data transmission unit had 50 bytes, then 50 bytes divided by the fixed predetermined size of each portion, 30 bytes, equals 2 when rounded up to the next highest integer. This number less one equals one—one is therefore the assigned count value for this data transmission unit. Yet another example is if a data transmission unit has a size of 157 bytes, since 157 bytes divided by 30 bytes is, when rounded up to the next highest integer value, equal to 6 then, 6−1=5 is the assigned count value for this data transmission unit.

The count value will determine when a data transmission unit is ready for processing. When the count value reaches zero then the data transmission unit is to be processed. If the count value for the data transmission unit is greater than zero, then that data transmission unit and the queue that it represents is rescheduled or reassigned to a slot that is x slots away from its current slot, x being the increment value for that specific queue. Again as an example, if a queue had an increment value of 5, with a data transmission unit at its head having a count value of 4, then when that data transmission unit is pointed to by the RTP, then the queue and its data transmission unit is to be moved to a slot that is five slots away from its current slot. It should be noted that such slot reassignment only occurs in one direction. It should also be noted that after each reassignment the count value for the data transmission unit is decremented by one. Thus, the above example of the data transmission unit having a count of four will now have a count value of three after its reassignment. The increment value for each queue does not change after every slot reassignment.

It must be noted that for the scheduler to be able to cover what is essentially infinite time, a "wrap around" of the scheduler slots is used. For FIG. 1, if it is assumed that time flows from left to right in the figure, as in a slot refers to a time period subsequent to the time period referred to by its neighbouring slot on the left, then the last slot in the scheduler is the right most slot. Once this slot is used, the scheduler "wraps around" and begins to use the left most slot and the process continues. Thus, if a data transmission unit and its queue are to be reassigned, for example four slots into the future and the current slot of the data transmission unit and its queue are only two slots away from the edge of the scheduler, then the other two slots are taken from the left most slot in the figure.

Figure 2:
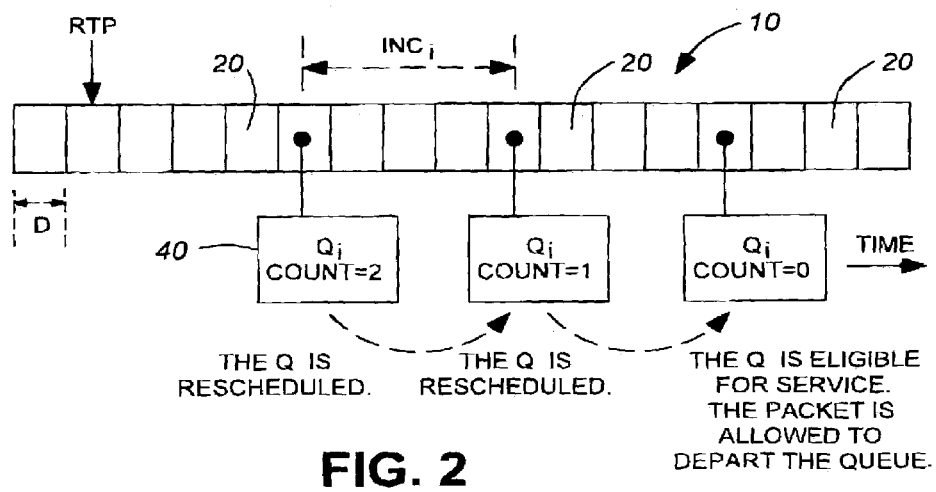
FIG. 2 is a schematic illustration of what occurs with a scheduler of FIG. 1 when a queue is rescheduled.

The above scheme allows for the co-existence of fixed length data transmission units and variable length data transmission units on the same scheduler. Furthermore, the above scheme bounds the size of the scheduler such that the maximum number of slots that is needed is equal to the maximum increment value possible for a given queue plus one. As an example, if the maximum increment value that can be assigned to a queue is equal to 100 slots then the maximum required size for the scheduler is 101 slots. To further illustrate the above concept, FIG. 2 schematically illustrates what occurs when a queue is rescheduled. As can be seen from the figure, a scheduler 10 is presented with multiple slots, each slot 20 having a given width of D units of time. In this example, the queue of $Q_1$ has a size of three portions long. Thus, because there are three portions in the data transmission unit at the head of $Q_1$ therefore the count value assigned is 3−1=2. Once the RTP reaches the initial slot for $Q_1$ the count value is decremented and the queue is reassigned to a slot that is $INC_1+1$, that is $INC_1$ slots away from its initial slot. This can been seen in the Figure where the arrow points to $Q_1$ where the count value is equal to one. When the RTP reaches this new slot the count value is still not equal to zero and therefore the data transmission unit and its queue are again reassigned to another slot that is again $INC_1$ slots away. At this point, the count value is again decremented to arrive at a count value of zero. When the RTP again reaches this third new slot then the count value is equal to zero and the data transmission unit can be processed. For this example, the increment value is 5. As can be seen, as long as the count value is greater than the predetermined value, in this case 0, then the DTU is not processed.

Figure 3:
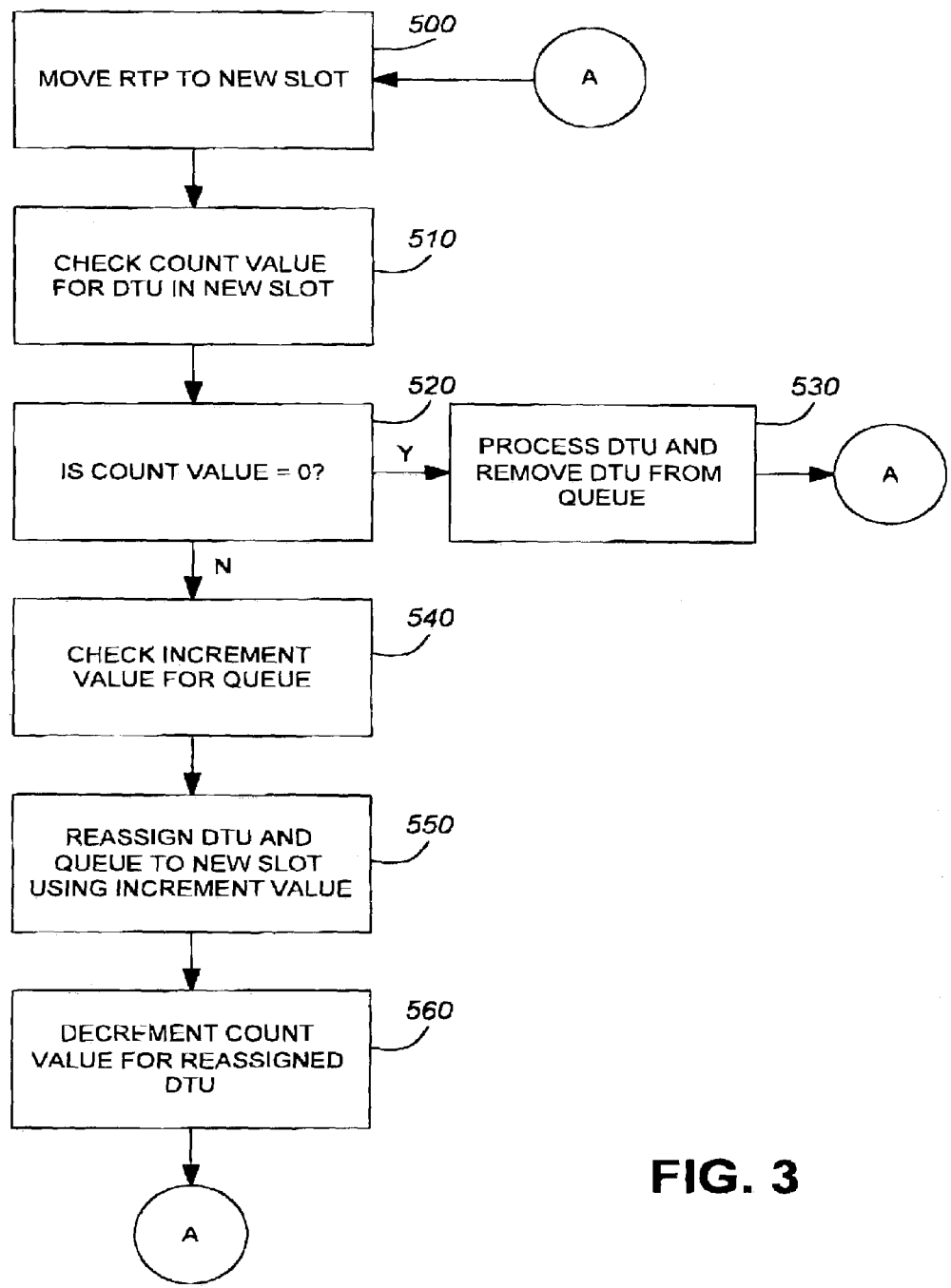
FIG. 3 is a flow chart detailing the steps executed when practising the invention.

Referring to FIG. 3 a flow chart detailing the steps taken in implementing the above scheme is illustrated. The process begins with step 500, that of moving the RTP to a new slot in the scheduler. Step 510 then checks the count value for the DTU in the new slot. This DTU is at the head of a queue that is assigned to that slot. Step 520 checks to see if the count value for the DTU and the slot being examined is equal to zero. If the count value is equal to zero then step 530 is that of actually processing the DTU and removing it from the queue. After step 530 the logic flow than uses connector A to return to step 500, that of moving the RTP to the next slot in the scheduler.

If, on the other hand, the count value for the DTU is not equal to zero then the increment value for the queue at that slot is checked in step 540. Step 550 is that of reassigning the DTU and the queue to a new slot using the increment value. The new slot to which the DTU and queue are to be assigned is x number of slots away from its previous slots where x is the increment value. Step 560 is that of decrementing the count value for the reassigned DTU. With this step the DTU gets closer to being eligible to be processed. After step 560, connector A again refers back to step 500 that of moving the RTP to a new slot.

It should be noted that the scheme described above can be implemented in either hardware or software. In software, it can be implemented by either a general purpose CPU (Central Processing Unit), or a specialized processing unit that executes specific software modules that execute the steps outlined above. In hardware it can be implemented using hardwired logic and can be used for network routers and/or network management devices.

The scheme described above, however, need not be constrained to network applications. It can be used for any processes that require scheduling of events that have variable processing times.

I claim:

1. A method of scheduling data transmission units for processing, the method comprising:

a) providing a scheduler having a plurality of slots, each slot representing a specific amount of time, the scheduler further having an indicator which indicates which slot is being examined, the indicator sequentially moving from one slot to another when the specific amount of time has elapsed;

b) providing at least one queue of data transmission units for processing, each queue being assigned an increment value based on a desired processing rate in portions of data transmission units per second for each queue, with all portions having a single predetermined fixed size, each data transmission unit being assigned a count value based on the size of the data transmission unit;

c) assigning each queue a specific slot in the scheduler; and d) when the indicator encounters a queue in a slot in the scheduler, executing the following steps:

d1) determining the increment value for the queue;

d2) determining the count value assigned to a data transmission unit at a head of the queue; and either d3) if the count value of the data transmission unit is greater than a predetermined value, decrementing the count value, and reassigning the queue to another subsequent slot in the scheduler based on the count value of the data transmission unit and on the increment value for the queue; or d4) if the count value of the data transmission unit is equal to the predetermined value, processing the data transmission unit and removing it from the queue.

2. A method as in claim 1 wherein the count value in step b) is found by determining how many portions of a fixed size a data transmission unit may be divided into and reducing a number of those portions by one such that if a data transmission unit can be divided into x portions, the count value assigned will be x−1, x being a positive integer.

3. A method as in claim 1 wherein the increment value for a queue is determined by the formula $$INC = \frac{1}{D \times r}$$

where

INC is the increment value;

D is the specific amount of time; and r is the desired processing rate in portions of data transmission units per second.

4. A method of scheduling processing of data transmission elements using a scheduler having slots, each slot having a location and each slot representing a fixed amount of processing time, the method comprising:

a) choosing a slot in the scheduler;

b) determining if the slot has a data transmission unit assigned;

c) if the slot has a data transmission unit assigned, executing the following steps:

c1) retrieving a count value for the data transmission unit;

c2) if the count value is greater than a predetermined value, reassigning the data transmission unit to a subsequent slot in the scheduler and decrementing the count value, the location of the subsequent slot being determined by an increment value associated with a specific service level for the data transmission unit; and c3) if the count value is equal to or less than the predetermined value, processing the data transmission unit;

d) choosing a next slot in the scheduler and repeating steps b)–d).

5. A method as in claim 4 wherein the location of the subsequent slot is x slots from a current slot, x being a number equal to the increment value.

6. A method as in claim 4 wherein the count value is determined by the following process:

c1-1) determining the size of the data transmission unit;

c1-2) dividing the size by a specific fixed value and rounding up a result to a nearest larger integer value; and c1-3) subtracting one from the nearest larger integer value to arrive at the count value, wherein the specific fixed value corresponds to a desired predetermined size of data transmission unit.

* * * * *